US010805993B2

(12) United States Patent
Ha et al.

(10) Patent No.: US 10,805,993 B2
(45) Date of Patent: Oct. 13, 2020

(54) DOOR AND COOKING APPLIANCE WITH THE SAME

(71) Applicant: LG ELECTRONICS INC., Seoul (KR)

(72) Inventors: Jung Hyeong Ha, Seoul (KR); Sung-Hun Sim, Seoul (KR); Young Min Lee, Seoul (KR); Yun Byung Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 223 days.

(21) Appl. No.: 16/026,188

(22) Filed: Jul. 3, 2018

(65) Prior Publication Data

US 2019/0014626 A1 Jan. 10, 2019

(30) Foreign Application Priority Data

Jul. 7, 2017 (KR) ........................ 10-2017-0086572

(51) Int. Cl.

| | |
|---|---|
| ***A21B 3/02*** | (2006.01) |
| ***H05B 6/76*** | (2006.01) |
| ***E06B 5/00*** | (2006.01) |
| ***H05B 6/64*** | (2006.01) |

(52) U.S. Cl.

CPC ............... *H05B 6/763* (2013.01); *E06B 5/00* (2013.01); *H05B 6/647* (2013.01)

(58) Field of Classification Search

CPC ...... H05B 1/0263; H05B 6/129; H05B 6/763; A21B 1/06; A21B 3/02; A21B 1/24; E06B 5/00

See application file for complete search history.

(56) References Cited

U.S. PATENT DOCUMENTS

| | | | | |
|---|---|---|---|---|
| 2005/0072777 A1* | 4/2005 | Kim | ........................ | H05B 6/763 219/741 |
| 2013/0008894 A1* | 1/2013 | Nobue | ................. | H05B 6/6414 219/702 |
| 2018/0153002 A1* | 5/2018 | Carcano | ................. | H05B 6/763 |
| 2018/0153003 A1* | 5/2018 | Carcano | ............... | H05B 6/6414 |
| 2019/0021145 A1* | 1/2019 | Ha | ......................... | H05B 6/763 |

FOREIGN PATENT DOCUMENTS

| | | | |
|---|---|---|---|
| DE | 102014109161 | A1 | 4/2015 |
| EP | 1862741 | A2 | 12/2007 |
| EP | 2731404 | A1 | 5/2014 |
| KR | 10-1997-0016335 | B1 | 5/1999 |
| KR | 10-2005-0032424 | A | 4/2005 |
| KR | 10-2009-0123429 | A | 12/2009 |
| KR | 10-2017-0067288 | A | 6/2017 |

* cited by examiner

*Primary Examiner* — Michael A Laflame, Jr.
(74) *Attorney, Agent, or Firm* — Dentons US LLP

(57) ABSTRACT

The present disclosure relates a door and a cooking appliance with the same. The door includes a first choke part installed at the inner surface of the door panel, and disposed at a vertical outer side of the open window; a second choke part installed at the inner surface of the door panel and disposed at the lateral outer side of the open window, wherein the second choke part is disposed between the open window and the connection mechanism; and a cover frame installed at the inner surface of the door panel, configured to accommodate the connection mechanism inside the cover frame and form side walls at the vertical outer side of the first choke part and the lateral outer side of the second choke part.

20 Claims, 10 Drawing Sheets

DOOR AND COOKING APPLIANCE WITH THE SAME

CROSS-REFERENCE TO RELATED APPLICATIONS

This application claims the priority of Korean Patent Application No. 10-2017-0086572 filed on Jul. 7, 2017, in the Korean Intellectual Property Office, the disclosure of which is hereby incorporated by reference in its entirety.

BACKGROUND

1. Technical Field

The present disclosure relates to a door and a cooking appliance with the same, and more particularly, a door provided to open and close a cooking chamber of an oven and the like, and a cooking appliance provided with the same.

2. Description of the Related Art

A cooking appliance is one of home appliances for cooking food and is an appliance that is installed in a kitchen space to cook food according to an intent of a user. The cooking appliance may be variously classified into various categories according to a heat source, a form thereof, and a type of fuel which is used in the cooking appliance.

When classifying the cooking appliance according to a method of cooking food, the cooking appliance may be classified into an open cooking appliance and an enclosed cooking appliance according to a shape of a space in which food is placed. The enclosed cooking appliance includes an oven, a microwave oven, and the like, and the open cooking appliance includes a cooktop, a hop, and the like.

The enclosed cooking appliance is a cooking appliance configured to enclose a space in which food is placed and heat the enclosed space to cook the food. A chamber that is a cooking chamber, which is a space in which food is placed and which is enclosed when cooking the food, is provided inside a main body of the enclosed cooking appliance. The cooking chamber is a space for actually cooking the food. A heat source is provided inside the cooking chamber or in an external space to heat the cooking chamber.

Among the enclosed cooking appliance, an electric oven is a device configured to cook various foods inside the electric oven using an electric heater to raise a temperature inside the electric oven. Unlike a gas oven configured to generate flame using gas, since the electric oven does not generate flame, there is an advantage in which the electric oven is safe from fire when compared to the gas oven.

However, since the electric oven is configured with a structure in which food is directly heated through heating of the electric heater and the like, there occurs a problem in that excessive cooking is performed only on an outside of the food when the food is cooked using the electric oven even though an inside of the food is not properly cooked.

Therefore, in recent years, a composite electric oven is currently developed to be able to uniformly entirely heat food using heat of the electric oven with a microwave by adding a structure capable of using the microwave to the electric oven.

Meanwhile, a door configured to selectively open and close a cooking chamber is rotatably provided at an enclosed cooking appliance. The door is rotatably installed at a main body of the enclosed cooking appliance by a door hinge which is provided between the main body, at which the cooking chamber is formed inside the main body, and the door, and thus the door may be pivoted centering on a portion coupled to the main body through the door hinge to selectively open and close the cooking chamber.

The door may be configured to include a door panel configured to form a frame and an exterior appearance and at which an open window is formed at an inner side of the door, a door glass configured to cover the open window and mounted on the door panel, and a fixing structure configured to tightly contact the door glass to the door panel.

In the case of the composite electric oven, a heat blocking structure configured to block heat delivered to the outside as well as an electromagnetic wave leak blocking structure configured to prevent an electromagnetic wave from leaking to the outside should be provided at the door.

To form the electromagnetic wave leak blocking structure at the composite electric oven, a choke filter is installed at an edge of the door. A front surface of the main body and the choke filter configure an electromagnetic wave shielding circuit (L-C).

In the door, the electromagnetic wave leak blocking structure is generally formed such that a choke plate is installed at the door panel configuring the exterior appearance and the frame of the door. The choke plate is formed in a quadrangular plate shape corresponding to a shape of the door panel, and a choke, which is a structure configured to shield the electromagnetic wave, is formed at four edges of the choke plate.

FIG. 1 is a diagram illustrating an electromagnetic wave shielding structure of a door provided at a typical cooking appliance.

Referring to FIG. 1, a choke 2 of a "⊏" shape is formed at an inner side of an end portion of a door 1. The choke 2 is bent to extend as a choke lower surface 2*a*, a choke inner surface 2*b*, and a choke upper surface 2*c*, and a slot 2*d* is formed at the choke upper surface 2*c* at a predetermined interval. The choke 2 formed as described above is disposed in a space between each edge of the door 1 and an open window.

As an important characteristic determining electromagnetic wave performance of a composite electric oven, there are bandwidth and incidence angle characteristics of the choke 2. Further, such characteristics are highly relevant to physical magnitudes such as a space surrounded by the choke 2, that is, a size of a choke room, a length of the choke inner surface 2*b*, a length of the choke upper surface 2*c*, and the like.

Meanwhile, a damping structure configured to adjust an opening speed of the door so as to prevent an abrupt opening of the door, and a tilting structure configured to allow a tilting of a handle may be provided at the door of the composite electric oven. In the case of a door that is vertically rotatably installed, the above-described structures are installed to be positioned at both side portions of the door.

In the door having such a structure, a gap between a lateral end portion of the door and an open window thereof is to be narrower than that between a vertical end portion of the door and the open window thereof. That is, a space in which the choke 2 can be disposed at both sides of the door is inevitably narrowed.

For this reason, a size of the choke 2 disposed at the both sides of the door is necessarily designed to be reduced in comparison with that of the choke 2 disposed at an upper portion side and a lower portion side of the door. That is, as the structure for the damping or the tilting is installed at both of the lateral portions of the door, the space in which the choke 2 can be installed at both of the lateral side portions of the door is narrowed such that a size of the choke room is inevitably reduced.

As is described above, when the size of the choke room is designed to be reduced at both of the lateral portions of the door, the following problem may occur.

That is, when compared to the choke 2 that is formed at the upper and lower portions of the door, the size of the choke room of the choke 2 formed at both of the lateral portions of the door is asymmetrically reduced such that electromagnetic wave shielding performance may be degraded.

Further, as the size of the choke room is narrowed, a length of the choke 2 surrounding the choke room and thus, when the choke 2 is designed, sensitivity according to increase and decrease of the length of the choke 2 is increased such that the design of the choke 2 for satisfying the electromagnetic wave shielding performance becomes very difficult.

SUMMARY

It is an object of the present disclosure to provide a door having an improved structure capable of stably providing electromagnetic wave shielding performance even when a space in which a choke can be installed is narrow, and a cooking appliance with the same.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a door configured to open and close a cooking chamber of a cooking appliance, includes a door panel configured to form a frame of the door, at which an open window is formed inside the door panel, configured to be pivoted centering on a lower end portion in one direction or in another direction, and configured to open and close an open front surface of a main body 10 of the cooking appliance; a hinge member configured to pivotably couple the door panel to the main body; a handle installed at an outer surface of the door panel; a connection mechanism installed at an inner surface of the door panel and provided to connect the handle to the hinge member at a lateral outer side of the open window; a first choke part installed at the inner surface of the door panel, and disposed at a vertical outer side of the open window; a second choke part installed at the inner surface of the door panel and disposed at the lateral outer side of the open window, wherein the second choke part is disposed between the open window and the connection mechanism; and a cover frame installed at the inner surface of the door panel, configured to accommodate the connection mechanism inside the cover frame and form side walls at the vertical outer side of the first choke part and the lateral outer side of the second choke part, wherein each of the first choke part and the second choke part includes a choke lower surface extending from the side wall formed by the cover frame in a width direction of the door panel; a choke inner surface extending from the choke lower surface in a thickness direction of the door panel; and choke upper surfaces, each of which extends from the choke inner surface in a direction toward the cover frame, and the second choke part further include a choke extending surface e extending from each of the choke upper surfaces.

Also, the choke extending surface e may extend at a position spaced away from the choke inner surface by a length of each of the choke upper surfaces in a direction toward the choke lower surface.

Also, the choke extending surface e may be formed such that the choke upper surfaces are formed to be bent in the direction toward the choke lower surface.

Also, the door may further include a choke frame installed at the inner surface of the door panel and at which at least a portion of the first choke part is formed at an upper edge and a lower edge of the choke frame, and at least a portion of the second choke part is formed at each of both lateral edges of the choke frame.

Also, the door may further include a protruding frame protruding to the thickness direction of the door panel and configured to a side wall surrounding an outer side of the open window, the choke frame may be coupled to the protruding frame, the choke lower surface is formed by the door panel, the choke inner surface may be formed by the side wall that is formed by the protruding frame, and the choke upper surfaces may be formed at the edge of the choke frame.

Also, the choke frame may be formed in a shape corresponding to a shape of the protruding frame and may include a coupler coupled to the protruding frame, and the choke upper surfaces may be formed at an outer edge of the coupler.

Also, the door may further include a glass cover of a flat plate shape installed at the inner surface of the door panel and configured to cover the open window, and the glass cover may be installed to be in contact with the choke upper surfaces.

Also, the second choke part may extend along a length direction of the coupler, and a plurality of slots may be periodically disposed on the second choke part along the length direction of the coupler.

Also, the plurality of slots may include a first slot formed to have a length corresponding to a length of the choke upper surface, and a second slot formed to have a length that is greater than the length of the choke upper surface, and the first slot and the second slot may be alternately disposed.

Also, the plurality of slots may include a first slot formed to have a length corresponding to a length of the choke upper surface, and a second slot formed to have a length that is greater than the length of the choke upper surface, and one or more of the first slots and a greater number of second slots than the one or more of the first slots may be alternately disposed.

Also, the first slot may be formed to have a length extending to a boundary portion between the choke upper surface and the coupler, and the second slot may be formed to have a length further extending from the boundary portion between the choke upper surface and the coupler toward the coupler.

Also, in accordance with another aspect of the present disclosure, a cooking appliance configured to cook food, includes a main body at which a cooking chamber is formed inside the main body and having a front surface that is open; and a door installed at the front surface of the main body and configured to open and close the cooking chamber, wherein the door includes a door panel configured to form a frame of the door, at which an open window is formed inside the door panel, configured to be pivoted centering on a lower end portion in one direction or in another direction, and configured to open and close the cooking chamber formed inside the main body; a hinge member configured to pivotably couple the door panel to the main body; a handle installed at an outer surface of the door panel 110; a connection mechanism installed at an inner surface of the door panel and provided to connect the handle to the hinge member at a lateral outer side of the open window; a first choke part installed at the inner surface of the door panel, and disposed at a vertical outer side of the open window; a second choke part installed at the inner surface of the door panel and disposed at the lateral outer side of the open window, wherein the second choke part is disposed between the open window and the connection mechanism; and a cover frame installed at the inner surface of the door panel, configured to accommodate the connection mechanism inside the cover frame and form side walls at the vertical outer side of the first choke part and the lateral outer side of the second choke part, wherein each of the first choke part and the second choke part includes a choke lower surface extending from the side wall formed by the cover frame in a width direction of the door panel; a choke inner surface extending from the choke lower surface in a thickness direction of the door panel; and choke upper surfaces, each of which extends from the choke inner surface in a direction toward the cover frame, and wherein the second choke part further includes a choke extending surface e extending from each of the choke upper surfaces toward the door panel along a thickness direction of the door panel.

In accordance with the door and the cooking appliance with the same according to the present disclosure, there are an advantage capable of stably providing electromagnetic wave shielding performance and improved incidence angle performance even when the space in which the choke can be installed is narrow due to mechanism structures, such as a connection mechanism and the like, installed at the door.

DETAILED DESCRIPTION

Figure 1:
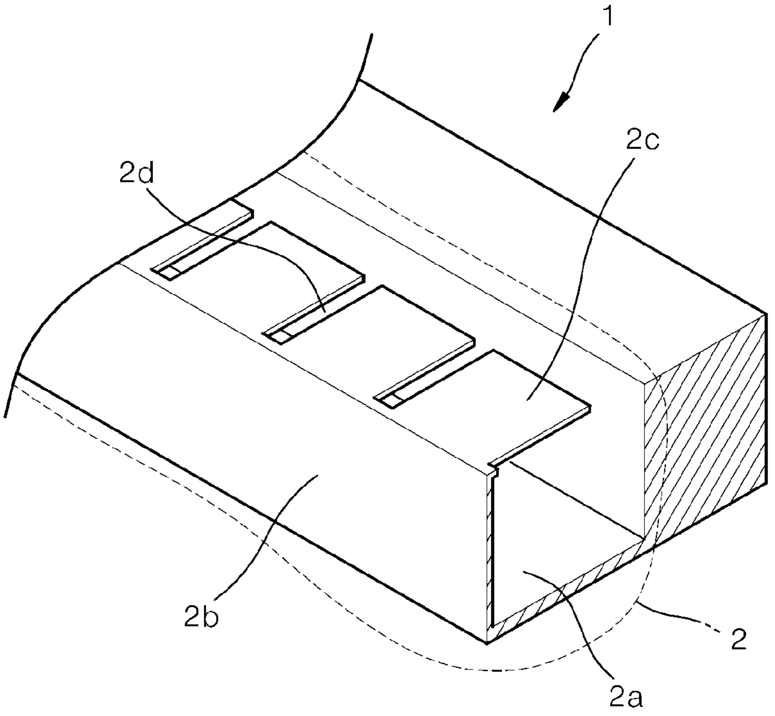
FIG. 1 is a diagram illustrating an electromagnetic wave shielding structure of a door provided at a typical cooking appliance.

Hereinafter, embodiments of a door and a cooking appliance with the same according to the present disclosure will be described with reference to the accompanying drawings. For convenience of description, thicknesses of lines and sizes of components shown in the drawings may be exaggerated for clarity and convenience of explanation. In addition, the terms described below are defined in consideration of the functions of the present disclosure, and these terms may be varied according to the intent or custom of a user or an operator. Therefore, these terms should be defined on the basis of the contents throughout the present application.

[Overall Structure of Cooking Appliance]

Figure 2:
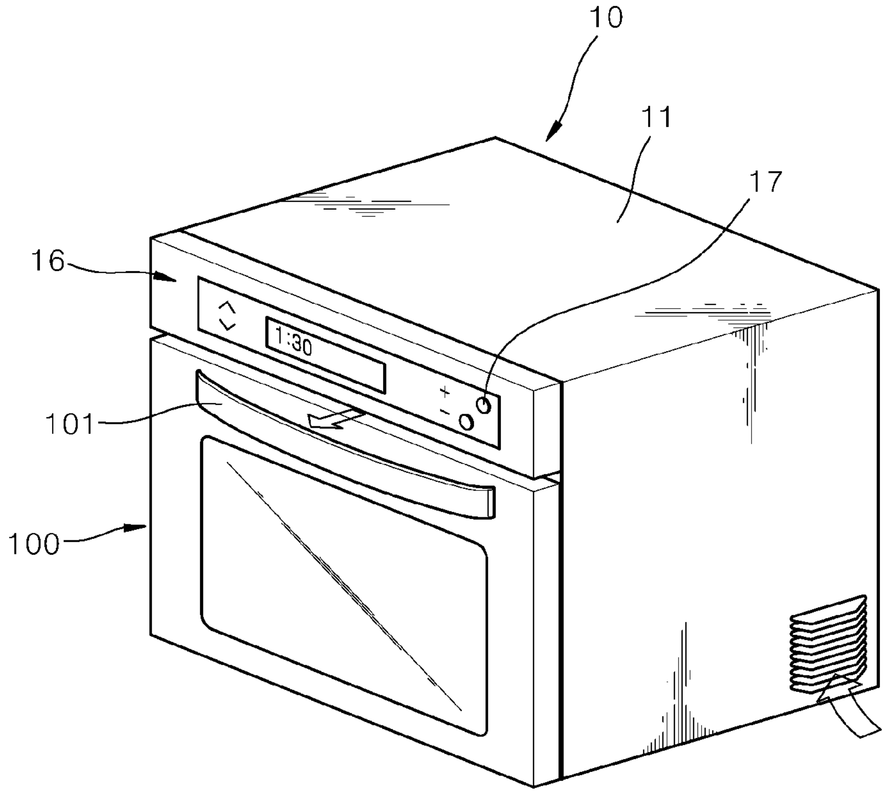
FIG. 2 is a perspective view illustrating a cooking appliance according to a first embodiment of the present disclosure.
Figure 3:
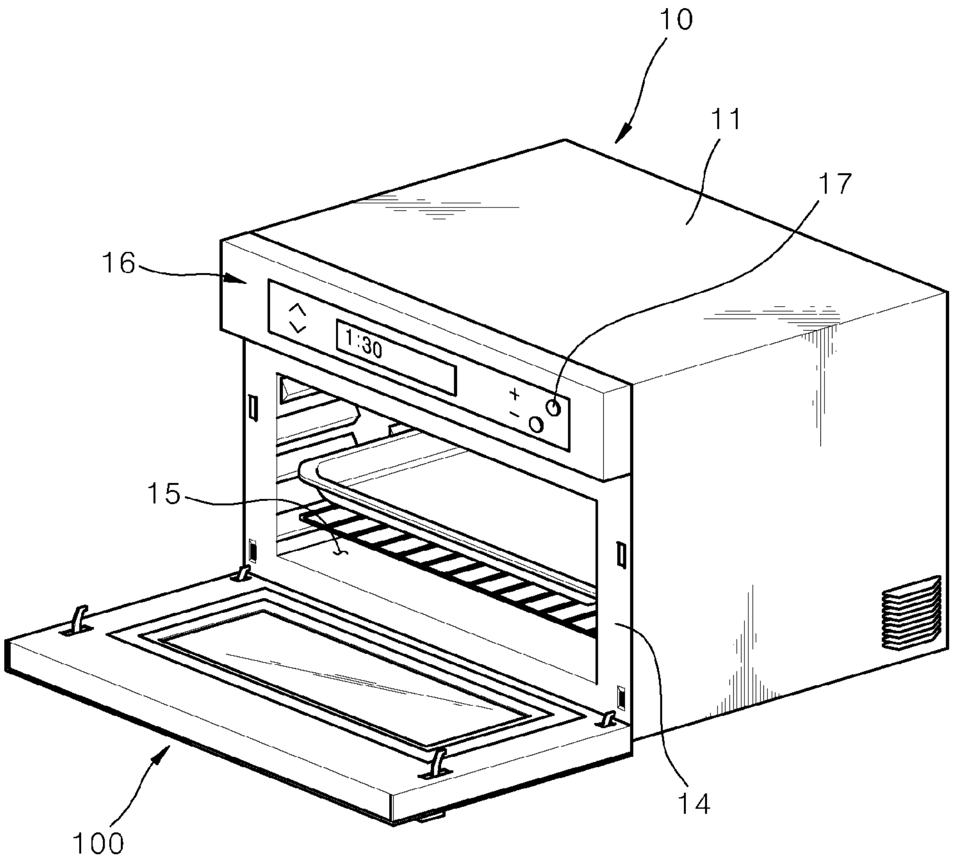
FIG. 3 is a perspective view illustrating a door open state of the cooking appliance illustrated in FIG. 1.
Figure 4:
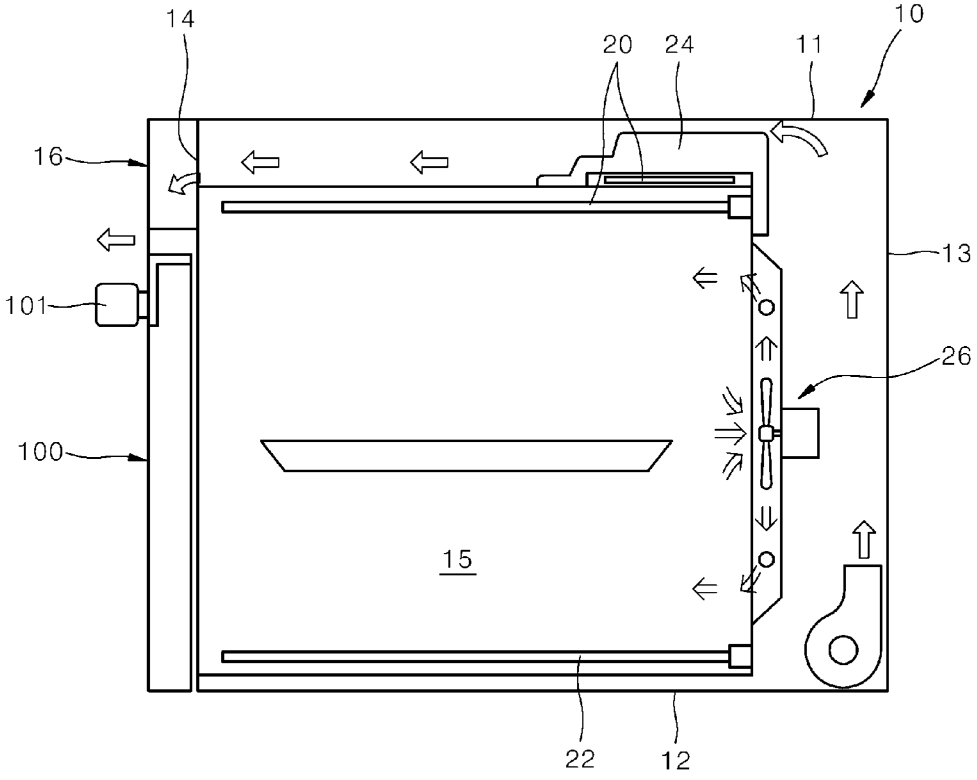
FIG. 4 is a cross-sectional view illustrating a schematic structure of the cooking appliance illustrated in FIG. 1.

FIG. 2 is a perspective view illustrating a cooking appliance according to a first embodiment of the present disclosure, FIG. 3 is a perspective view illustrating a door open state of the cooking appliance illustrated in FIG. 1, and FIG. 4 is a cross-sectional view illustrating a schematic structure of the cooking appliance illustrated in FIG. 1.

Referring to FIGS. 2 to 4, an exterior appearance of the cooking appliance according to one embodiment of the present disclosure is formed by a main body 10. The main body 10 may be provided in a shape including an approximate rectangular parallelepiped shape, and is formed of a material having predetermined strength so as to protect a plurality of components installed in an inner space of the main body 10.

The main body 10 may be configured to include a frame 11 configured to form left and right lateral surfaces and an upper surface of the main body 10, a base 12 disposed below the frame 11 and configured to form a bottom of the main body 10, a rear surface plate 13 disposed at a rear side of the frame 11 and configured to form a rear surface of the main body 10, and a front surface plate 14 disposed at a front side of the frame 11 and configured to form a front surface of the main body 10. An Opening configured to open a cooking chamber 15 in a front direction is formed inside the front surface plate 14.

The cooking chamber 15 is formed inside the main body 10. The cooking chamber 15 is configured in a hexahedral shape having an open front, and, in a state in which the cooking chamber 15 is enclosed, an inner space of the cooking chamber 15 is heated to cook food. That is, in the cooking appliance, the inner space of the cooking chamber 15 is a space in which the food is substantially cooked.

A door 100 configured to selectively open and close the cooking chamber 15 is rotatably provided in front of the main body 10. The door 100 may selectively open and close the cooking chamber 15 in a pull-down manner in which an upper end of the door 100 is vertically pivoted centering on a lower end of the door 100.

The door 100 is configured in a hexahedral shape entirely having a predetermined thickness, and a handle 101 configured to allow a user to grip the door 100 when pivoted is installed at a front surface of the door 100. The user may easily pivot the door 100 through the handle 101.

A control panel 16 is provided at an upper front surface of the main body 10, that is, over the door 100. The control panel 16 may be configured in a hexahedral shape having a predetermined inner space, and an input part 17 configured to input a manipulation signal for the user to operate the cooking appliance is provided on a front surface of the control panel 16.

A plurality of manipulation switches are provided at the input part 17, and, through such manipulation switches, the user may directly input the manipulation signal.

Also, a display may be further provided at the control panel 16 to provide operation information, cooking information of food, or the like of the door 100 and the cooking appliance with the same, and the user may verify various information regarding the cooking appliance through the display.

In addition, a cooking chamber heat source configured to heat an inner side of the cooking chamber 15 is provided inside the main body 10. The cooking chamber heat source may be implemented with a single heat source, and may be implemented with two or more heat sources. Hereinafter, the present embodiment will be limitedly described such that an internal temperature of the cooking chamber 15 is rapidly raised as well as is uniformly distributed, and the cooking chamber heat source is implemented with two or more heat sources so as to supply heat suitable for a characteristic of a cooking target inside the cooking chamber 15.

According to the present embodiment, the cooking chamber heat source may include an upper heat source configured to supply heat to the inner side of the cooking chamber 15 from an upper side the cooking chamber 15. Such an upper heat source may include an upper portion heater 20 located at an upper portion inside the cooking chamber 15 and configured to generate heat by electricity.

Alternatively, the cooking chamber heat source may include a lower heat source configured to supply heat to the cooking chamber 15 from a lower side of the cooking chamber 15 The lower heat source may include a lower portion heater 22 located at a lower portion inside the cooking chamber 15 or the lower side of the cooking chamber 15 and configured to generate heat. The lower portion heater 22 may supply heat to the cooking chamber 15 in a conducting method, and it may be connected to the cooking chamber 15 through a lower heater duct and may supply heat to the cooking chamber 15 in a convention method.

Also, the cooking chamber heat source may include a magnetron 24 configured to supply high-frequency heat inside the cooking chamber 15. The magnetron 24 is installed inside the main body 10, and it may be installed to be located over the cooking chamber 15.

In addition, the cooking chamber heat source may include a convection heat source 26 installed in rear of the cooking chamber 15 and configured to form forced convection as well as supply heat to the cooking chamber 15.

Additionally, an electric and electronic part, which is located in rear of the cooking chamber 15 or over the cooking chamber 15 inside the main body 10, may be included inside the main body 10. The electric and electronic part is connected to communicate with the control panel 16 and is provided to control an operation of the cooking appliance including the cooking chamber heat source and the like.

[Structure of Door]

Figure 5:
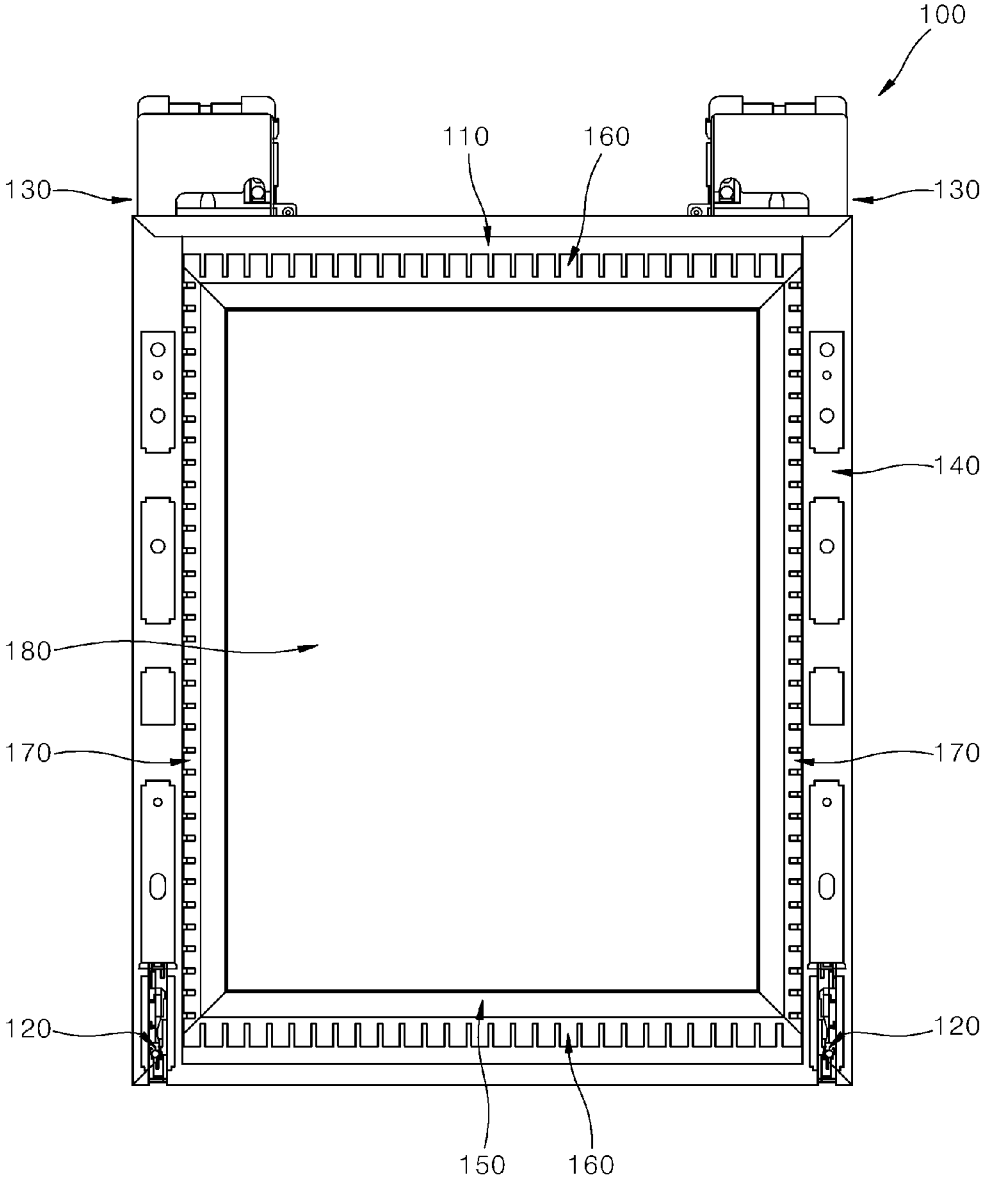
FIG. 5 is a diagram illustrating an inner surface of a door illustrated in FIG. 1.
Figure 6:
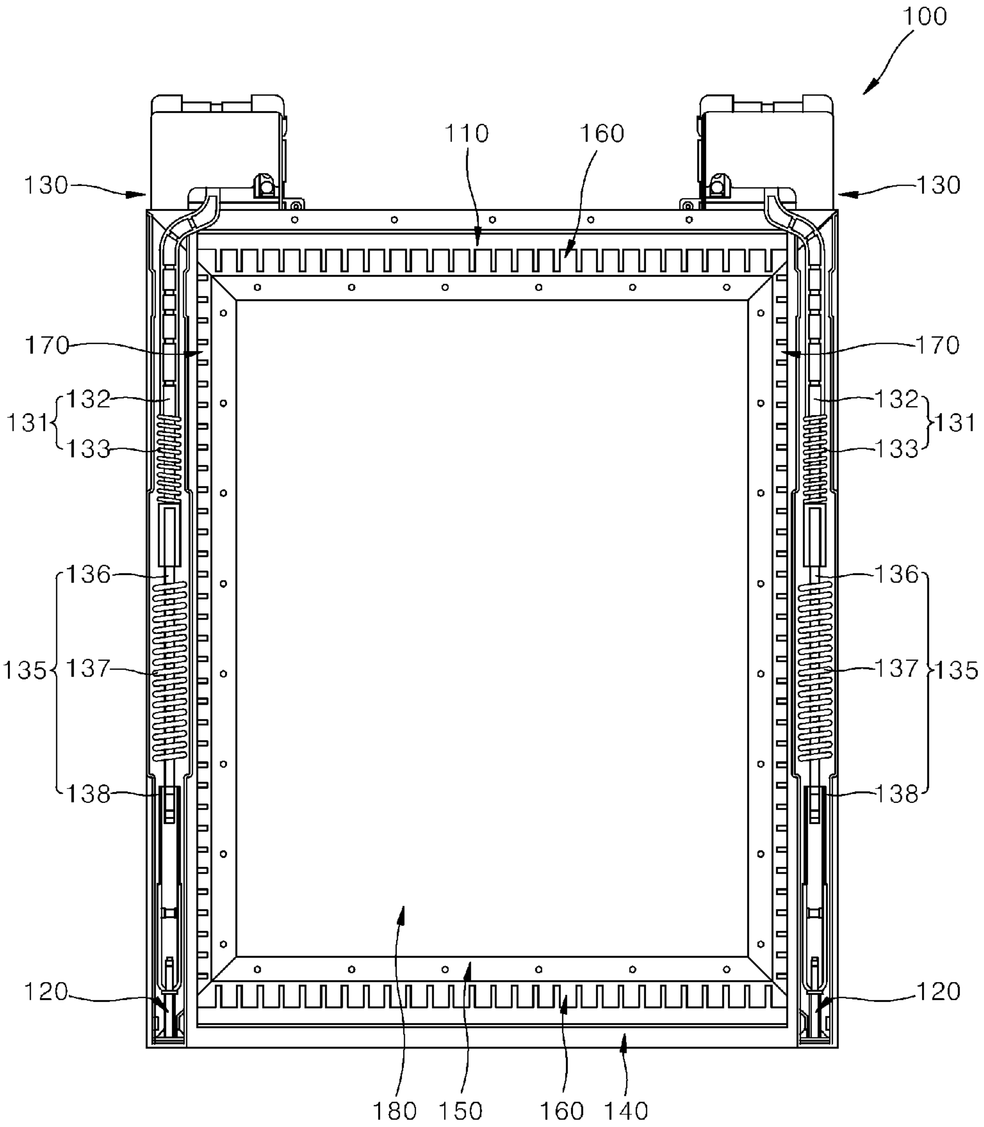
FIG. 6 is a cross-sectional view illustrating an internal structure of the door illustrated in FIG. 5.
Figure 7:
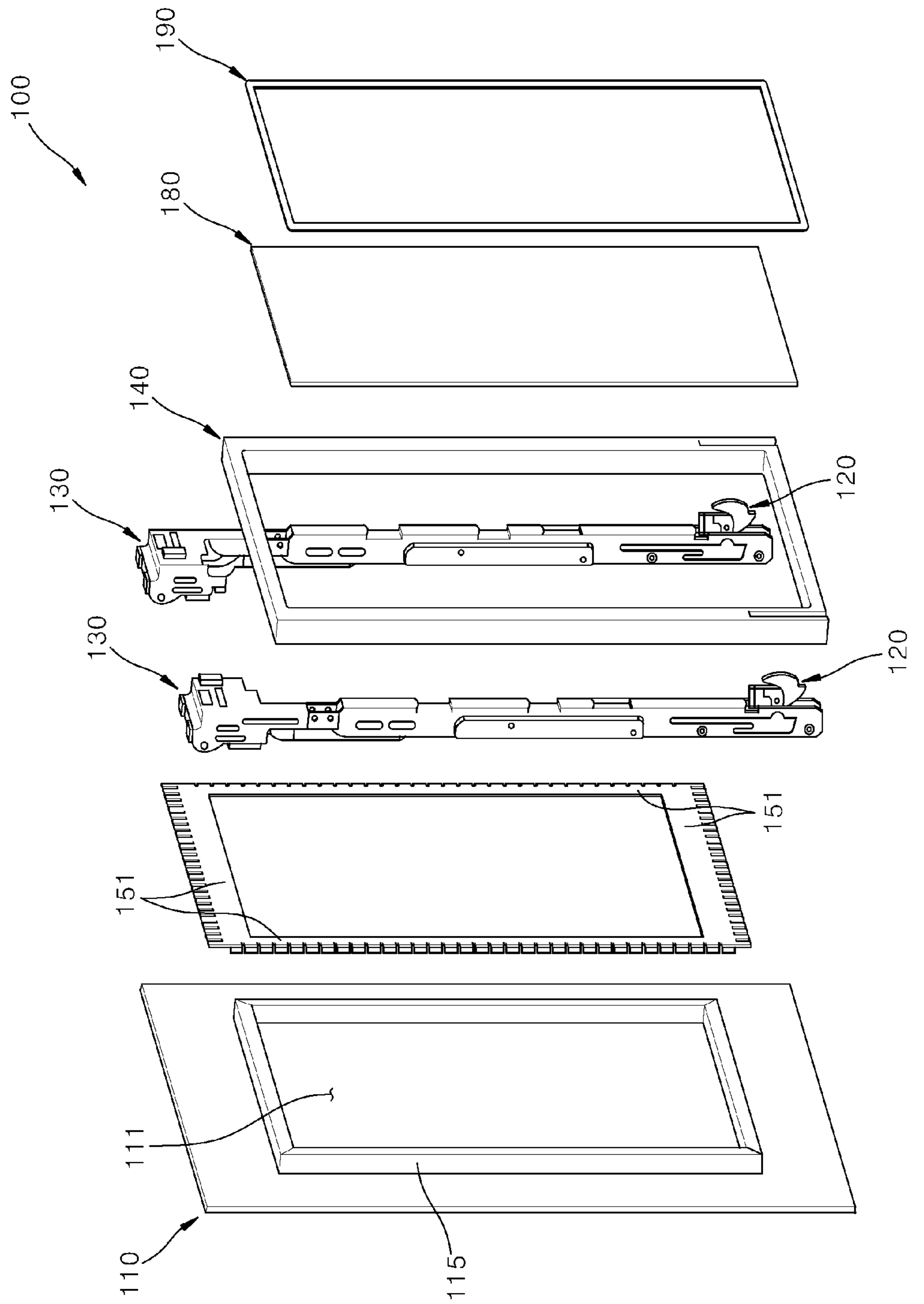
FIG. 7 is an exploded perspective view illustrating an exploded state of the door illustrated in FIG. 5.

FIG. 5 is a diagram illustrating an inner surface of a door illustrated in FIG. 1, FIG. 6 is a cross-sectional view illustrating an internal structure of the door illustrated in FIG. 5, and FIG. 7 is an exploded perspective view illustrating an exploded state of the door illustrated in FIG. 5.

Referring to FIGS. 5 to 7, the door 100 includes a door panel 110, a hinge member 120, a connection mechanism 130, a cover frame 140, a choke frame 150, a first choke part 160, and a second choke part 170.

The door panel 110 forms a front frame of the door 100, and may be formed in a hexahedral shape corresponding to a front surface shape of the main body 10. An open window 111 is formed to pass through the door panel 110 and is provided to visually watch the inner side of the cooking chamber 15.

The handle 101 (See, FIG. 4) is installed at an outer surface of the door panel 110. In the present embodiment, the handle 101 is exemplified and provided to be vertically tilted. When the user downwardly pulls the handle 101 to open the door 100, the handle 101 provided as described above may be downwardly tilted, and, when the user releases the handle 101 that is held by the user, the handle 101 may return to its original position.

The hinge member 120 is located at a lower portion of the door panel 110, and is provided to be located at a left edge and a right edge of the door panel 110.

The hinge member 120 is installed at the main body 10 to be located below the cooking chamber 15, and is provided to pivotably couple the door panel 110 to the main body 10. As one example, the hinge member 120 may be fixed and coupled to the main body 10, and may be pivotably connected to the door panel 110. The hinge member 120 may be pivotably coupled to a lower end portion of the connection mechanism 130, which will be described below, thereby being pivotably connected to the door panel 110.

The connection mechanism 130 is installed at an inner surface of the door panel 110. The connection mechanism 130 is disposed at a lateral outside of the open window 111, that is, at the left edge and the right edge of the door panel 110, and the connection mechanism 130 connects the handle 101 to the hinge member 120 at the lateral side of the open window 111. Accordingly, a region of each of the left edge and the right edge of the door panel 110 is occupied by a width of the connection mechanism 130.

As one example, the connection mechanism 130 may be configured in a form in which a tilting mechanism 131 and a damping mechanism 135 are vertically connected to each other.

Consequently, the tilting mechanism 131 is provided to be located at an upper portion of the connection mechanism 130 and is connected to the handle 101. The tilting mechanism 131 may be connect the handle 101, which is tiltable, to the door panel 110, and may provide an elastic force for returning the handle 101, which is tilted, to its original state.

For example, the tilting mechanism 131 may be provided in a form in which a first elastic member 133 of a coil spring shape is connected to a first rod 132 that is synchronized with a tilting of the handle 101 and is vertically movably provided. At this point, a lower end side of the first elastic member 133 is fixed not to be moved, an upper end side of the first elastic member 133 is coupled to the first rod 132, so that the first elastic member 133, which extends by the first rod 132 that is vertically moved when the handle 101 is tilted, may provide the elastic force for returning the handle 101, which is tilted, to its original position.

A damping mechanism 135 is provided to be located at a lower portion of the connection mechanism 130 and is connected to the hinge member 120. The damping mechanism 135 may provide a damping force for dampening a rotational force of each of the door panel 110 and the door 100 provided with the door panel 110.

For example, the damping mechanism 135 may be provided in a form in which a second elastic member 137 of a coil spring shape is connected to a second rod 136 that is synchronized with opening and closing operations of the door 100 and is vertically movably provided. At this point, an upper end side of the second elastic member 137 may be fixed to the second rod 136, and a lower end side of the second elastic member 137 may be interfered with a spring lever 138 into which the second rod 136 is liftably inserted.

When the door 100 being open is downwardly pivoted, the second rod 136 sliding along a cam shape of the hinge member 120 is downwardly moved, and the second elastic member 137 downwardly moved along the second rod 136 is interfered with the spring lever 138 to be elastically compressed, so that a damping force for dampening the rotational force of the door panel 110 may be provided.

The connection mechanism 140 is installed at the inner surface of the door panel 110. In the present embodiment, the cover frame 140 is exemplified to be formed in a quadrangular-shaped frame corresponding to the shape of the door panel 110. That is, the cover frame 140 is provided in a form in which a pair of frames disposed at an upper portion and a lower portion of the cover frame 140 and a pair of frames disposed at both side portions of the cover frame 140 are connected to form a "D" shape.

The cover frame 140 provided as described above forms a sidewall at each of a vertical outer side of the first choke part 160 and a lateral outer side of the second choke part 170.

The cover frame 140 is provided in a form in which a frame disposed at each lateral portion has a width that is wider than that of each of frames disposed at the upper portion and the lower portion. This is because the frames disposed at the upper portion and the lower portion form only side walls for forming the edge of the door 100, but, the frame disposed at each lateral portion forms a side wall for forming the edge of the door 100 and accommodates the connection mechanism 130 inside the cover frame 140.

The frame forming the lateral portion of the cover frame 140 is installed at the lateral outer side of the open window 111 to accommodate the connection mechanism 130 inside the cover frame 140, that is, at the left edge and the right edge of the door panel 110. Accordingly, a region of each of the left edge and the right edge of the door panel 110 is occupied by a width of the connection mechanism 140.

The cover frame 140 provided as described above forms a sidewall at each of the vertical outer side of the first choke part 160 and the lateral outer side of the second choke part 170.

The connection mechanism 150 is installed at the inner surface of the door panel 110. In the present embodiment, the choke frame 150 is exemplified and configured to include a shape corresponding to the shape of the door panel 110, that is, a quadrangular shape having four edges. At least a portion of the first choke part 160 may be formed at upper and lower edges of the choke frame 150, and at least a portion of the second choke part 170 may be formed at both lateral edges of the choke frame 150.

Meanwhile, the door 100 may further include a protruding frame 115 formed to protrude in a thickness direction of the door panel 110 and configured to form a side wall surrounding the outer side of the open window 111. The choke frame 150 is coupled to the protruding frame 115, and the choke frame 150 may be connected to the door panel 110 due to the coupling between the choke frame 150 and the protruding frame 115.

According to the present embodiment, a coupler 151 formed in a quadrangular shape corresponding to the shape of the protruding frame 115 and coupled to the protruding frame 115 is formed at each edge of the choke frame 150. At this point, the coupler 151 is formed to be located at a position that is further internally positioned than that of each of the first choke part 160 and the second choke part 170 which are formed at each edge of the choke frame 150.

The coupling between the protruding frame 115 and the coupler 151 may be performed by a connection work such as welding which is performed in a state in which a protruding end of the protruding frame 115 is in contact with the coupler 151.

The first choke part 160 is installed at the inner surface of the door panel 110, and is disposed at the vertical outer side of the open window 111. Further, the second choke part 170 is installed at the inner surface of the door panel 110 in association with the first choke part 160, and is disposed at the lateral outer side of the open window 111, wherein the second choke part 170 is disposed at a region between the connection mechanism 130 and the open window 111, more particularly, at a region between the side wall formed by the cover frame 140 and the open window 111.

The first choke part 160 and the second choke part 170 forms an electromagnetic wave leak prevention structure for preventing an electromagnetic wave from leaking to the outside through a gap between the front surface of the main body 10 and the door 100, and detailed structures thereof will be described in detail below.

In addition, the door 100 of the present embodiment may further include a glass cover 180. The glass cover 180 is installed at the inner surface of the door panel 110 to cover the open window 111.

In the present embodiment, the glass cover 180 is exemplified to be provided in a flat-plate shape. One surface of the glass cover 180 is installed to be in contact with choke upper surfaces c and d (See, FIGS. 8 and 10), and the glass cover 180 is installed not to protrude from a rear surface of the door 100, which faces the front surface of the main body 10, to the rear side of the door 100. That is, the rear surface of the door 100 at which the glass cover 180 is installed is formed in a flat plane.

The door 100 of the present embodiment, which is provided in a form in which the glass cover 180 formed in the above-described flat plate shape is installed at the rear surface of the door 100, may provide a flat plate shape door 100 that is slim and smoother when compared to a door provided with a convex type glass.

Meanwhile, an undescribed reference numeral "190" is a gasket that is provided to seal the glass cover 180.

[Structure of First Choke Part]

Figure 8:
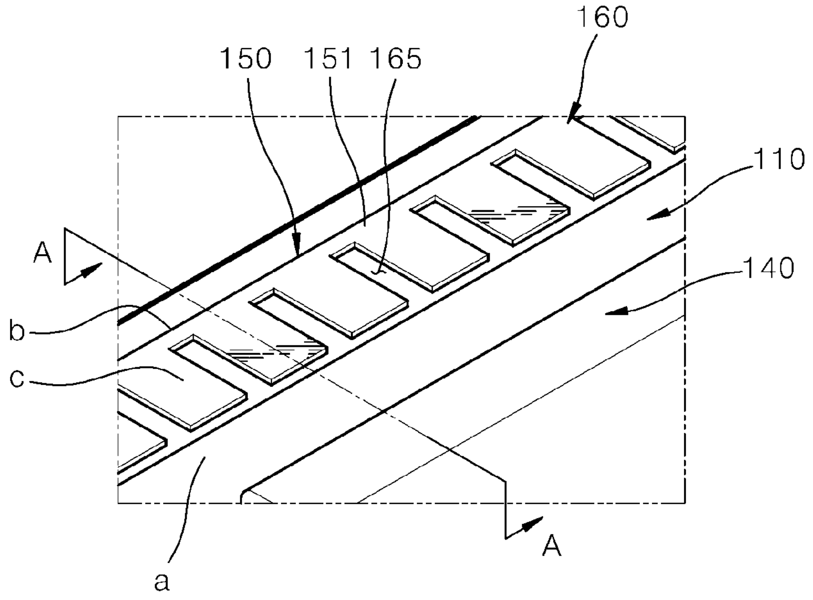
FIG. 8 is a perspective view illustrating a configuration of a first choke part according to the first embodiment of the present disclosure.
Figure 9:
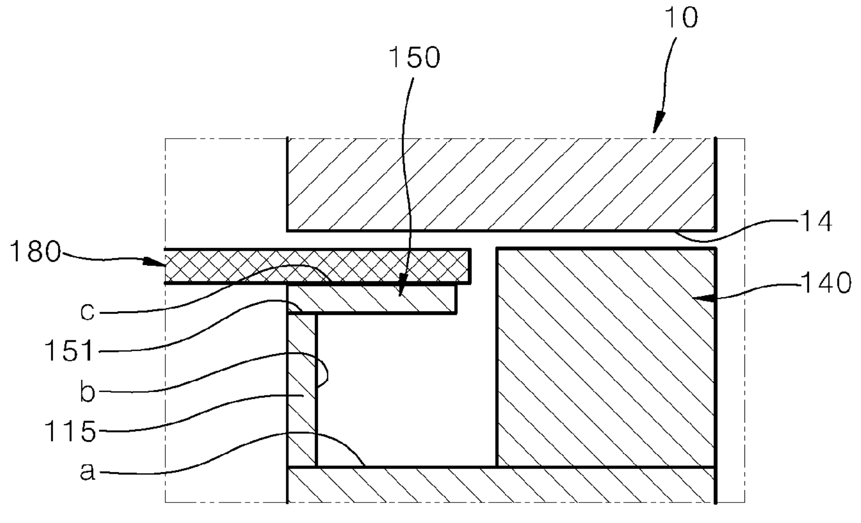
FIG. 9 is a cross-sectional view taken along line A-A of FIG. 8.

FIG. 8 is a perspective view illustrating a configuration of a first choke part according to the first embodiment of the present disclosure, and FIG. 9 is a cross-sectional view taken along line A-A of FIG. 8.

Referring to FIGS. 6 to 9, the first choke part 160 is installed at the inner surface of the door panel 110, and is disposed at the vertical outer side of the open window 111, that is, the upper end side and the lower end side of the door 100. The upper end side and the lower end side of the door 100 are portions at which mechanism structures such as the connection mechanism 130 and the like, and regions are relatively clear when compared to both of the lateral sides of the door 100.

The first choke part 160 disposed at such regions is provided in a form in which choke a lower surface a, a choke inner surface b, and the choke upper surface c are connected in a "⊏" shape.

The choke lower surface a is formed to extend from the side wall of the cover frame 140 in a width direction of the door panel 110. In the present embodiment, the choke lower surface a is exemplified and formed by the portion of the door panel 110.

Accordingly, a region between the side wall formed by the protruding frame 115 of the door panel 110 and the side wall formed by the cover frame 140 thereof configures the choke lower surface a.

The choke inner surface b is formed to extend from the choke lower surface a in the thickness direction of the door panel 110, that is, in a protruding direction of each of the protruding frame 115 and the cover frame 140. In the present embodiment, the choke inner surface b is exemplified and formed by the side wall formed by the protruding frame 115. That is, the portion of the door panel 110 and the side wall formed by the protruding frame 115 are connected to form a "ㄴ" shape, so that the choke lower surface a and the choke inner surface b, which are connected in the "ㄴ" shape, may be formed.

The choke upper surface c is formed to extend from the choke inner surface b in a direction toward the cover frame 140. In the present embodiment, the choke upper surface c is exemplified and formed at the edge of the choke frame 150. According to the present embodiment, the choke frame 150 may be connected to the protruding frame 115 through the coupling between the protruding end portion of the protruding frame 115, and the choke upper surface c formed at the outer edge of the coupler 151 may be connected to the choke inner surface b in a "ㄱ" shape.

The first choke part 160 configured to include the above-described structure is provided in a form in which the choke lower surface a, the choke inner surface b, and the choke upper surface c are connected in the "⊏" shape, and the choke room, which is surrounded by the choke lower surface a, the choke inner surface b, and the choke upper surface c, is formed inside the first choke part 160.

Since the first choke part 160 of the above-described structure is disposed at the upper end side and the lower end side of the door 100 which are spatially cleared, a length of the choke upper surface c may sufficiently extend and thus a length of the choke and a size of the choke room, which are sufficient to obtain satisfactory electromagnetic wave shielding performance, may be secured.

That is, since a sufficient space may be secured at the upper end side and the lower end side of the door 100 at which the first choke part 160, through extension of the length of the choke upper surface c as necessary, the length of the choke and the size of the choke room, which are sufficient to obtain electromagnetic wave shielding performance, may be secured.

According to the present embodiment, the first choke part 160 is formed to have a length that extends along the length direction of the coupler 151, that is, along the upper edge of the door 100 or the lower edge thereof. Further, a slot 165 is periodically disposed at the first choke part 160.

The first choke part 160 formed as described above configures an electromagnetic wave shielding circuit (L-C) which is configured with a combination of an inductance L and a capacitance C. For example, an inductance L component is formed on surfaces of the choke inner surface b and the choke upper surface c. At the same time, a capacitance C component is formed in a space between the front surface plate 14 of the main body 10, the choke room that is the internal space of the first choke part 160, and the slots 165. That is, the inductance L component is formed on the surface of the first choke part 160, and the capacitance C component is formed inside the first choke part 160 and in a periphery space thereof.

Accordingly, the electromagnetic wave shielding circuit (L-C) configured by the first choke part 160 serves to block a leak of the electromagnetic wave through the gap between the front surface plate 14 of the main body 10 and the door 100 at the upper and lower regions of the door 100.

[First Embodiment of Structure of Second Choke Part]

Figure 10:
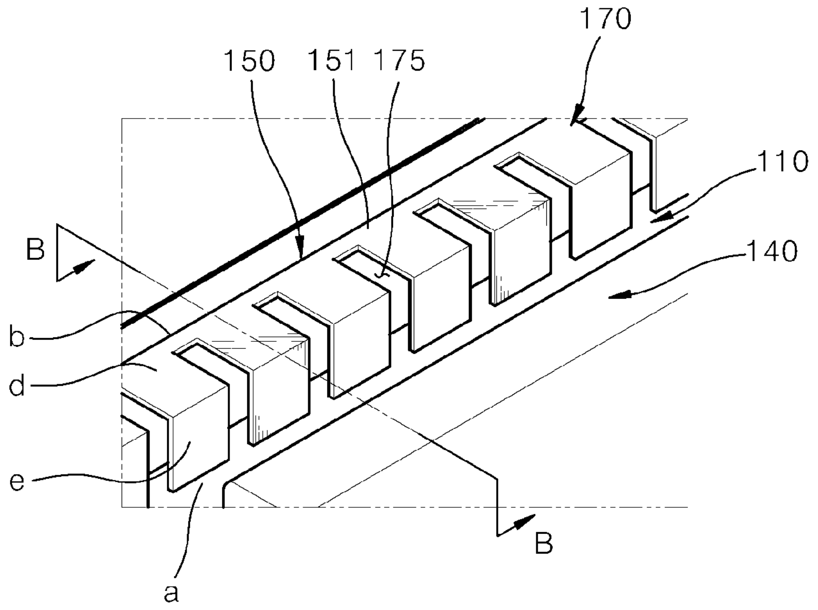
FIG. 10 is a perspective view illustrating a configuration of a second choke part according to the first embodiment of the present disclosure.
Figure 11:
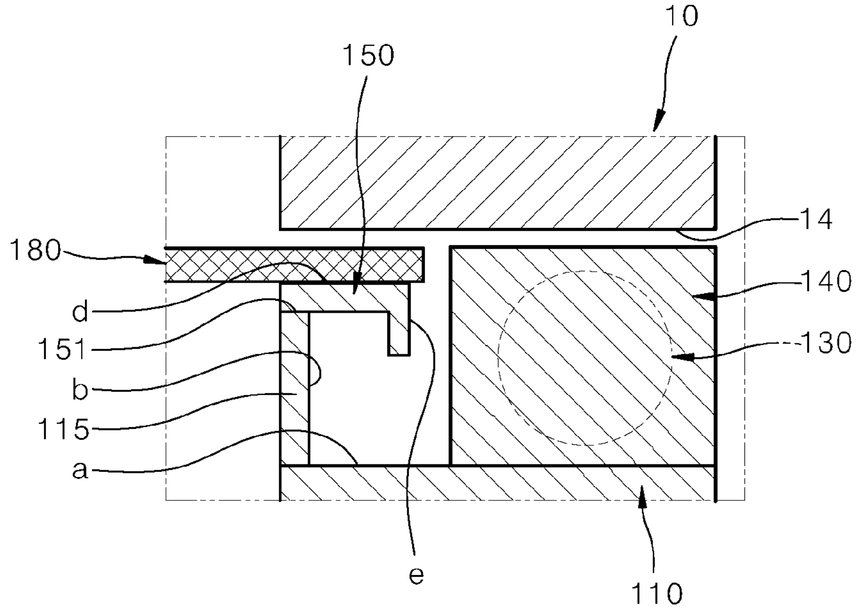
FIG. 11 is a cross-sectional view taken along B-B line of FIG. 10.

FIG. 10 is a perspective view illustrating a configuration of a second choke part according to the first embodiment of the present disclosure, and FIG. 11 is a cross-sectional view taken along B-B line of FIG. 10.

Referring to FIGS. 6, 10, and 11, the second choke part 170 is installed at the inner surface of the door panel 110 and is disposed at the lateral outer side of the open window 111. Both lateral sides of the door 100, that is, a left portion and a right portion of the door 100 are regions at which the mechanism structures such as the connection mechanism 130 are disposed, and the regions are relatively small in space when compared to the upper portion and the lower portion of the door 100.

According to the present embodiment, the second choke part 170 is disposed at a position that is internally retracted from the edge of the door 100 in the width direction thereof by widths of the connection mechanism 130 and the cover frame 140 installed at the door 100. The first choke part 170 disposed at such a position is provided in a form in which choke a lower surface a, a choke inner surface b, a choke upper surface d, and a choke extending surface e are connected in a "□" shape.

Among these, the choke lower surface a and the choke inner surface b may be formed the same shapes as or as approximately similar to those of the choke lower surface a and the choke inner surface b which form the first choke part 160. That is, a region between the side wall formed by the protruding frame 115 of the door panel 110 and the side wall formed by the cover frame 140 thereof forms the choke lower surface a, and the choke inner surface b is formed by the side wall which is formed by the protruding frame 115.

A major difference between the first choke part 160 and the second choke part 170 is the choke upper surface d and the choke extending surface e.

In the second choke part 170, the choke upper surface d is formed to have a length that is shorter than that of the choke upper surface c of the first choke part 160 (See, FIG. 9).

According to the present embodiment, the second choke part 170 is disposed at a position that is internally retracted from the edge of the door 100 in the width direction thereof by widths of the connection mechanism 130 and the cover frame 140 installed at the door 100, and the length of the choke upper surface d is inevitably shortened at the second choke part 170 disposed at such a position by a distance of which the second choke part 170 is retracted from the edge of the door 100. This is because the electromagnetic wave shielding circuit (L-C), which is configured by the second choke part 170, acts only in a region at which the second choke part 170 is located at a region facing the front surface plate 14 of the main body 10.

Accordingly, as the length of the choke upper surface d is shortened at the second choke part 170, the size of the choke room is also reduced. In this case, there occur problems in that the inductance L component and the capacitance C component are reduced and thus electromagnetic wave shielding performance at a corresponding region is degraded, and sensitivity according to increase and decrease of the length of the choke is increased when the choke is designed so that a choke design for satisfying electromagnetic wave shielding performance is very difficult.

Also, when the door 100 is configured to be thin by providing with the glass cover 180 of a flat plate shape (See, FIG. 7), it is actually difficult to extend the size of the choke room by increasing the length of the choke inner surface b.

In consideration of such a circumstance, in the present embodiment, the second choke part 170 is provided to further include the choke extending surface e.

The choke extending surface e is formed to extend from the choke upper surface d. In the present embodiment, the choke extending surface e is formed at the edge of the choke frame 150, and the choke upper surface d is exemplified and formed to be bent in a direction toward the choke lower surface a.

The choke extending surface e is formed to extend in the direction toward the choke lower surface a at a position that is spaced away from the choke inner surface b by the length of the choke upper surface d. At this point, the choke extending surface e may extend in a direction parallel to the side wall formed by the choke inner surface b and the cover frame 140, that is, in a form of being bent from the choke upper surface d by 90 degrees, or alternatively, the choke extending surface e may extend in a form of be bent from the choke upper surface d in a range of 30 to 90 degrees.

The choke extending surface e formed as described above increases an entire length of the second choke part 170 to increase the inductance L component which is formed by the surface of the second choke part 170.

That is, the second choke part 170 is disposed in environment in which the length of the choke upper surface d is reduced to cause reduction in the inductance L component and the capacitance C component, but, the entire length of the second choke part 170 is increased by the choke extending surface e to thereby increase the inductance L component.

Therefore, influence of the reduction in the inductance L component and the capacitance C component, which is caused from that the second choke part 170 is disposed at position where a space is small, may be dampened by an increase of the inductance L component resulting from an increase of the length of the second choke part 170 due to the choke extending surface e.

Through this, occurrence of a problem of degradation in the electromagnetic wave shielding performance at the second choke part 170 or increase of sensitivity according to increase and decrease of the length of the choke at the second choke part 170 may be prevented, so that the cooking appliance of the present embodiment is capable of stably providing electromagnetic wave shielding performance as well as allowing the choke to be easily designed for satisfying the electromagnetic wave shielding performance.

According to the present embodiment, the second choke part 170 is formed to have a length that extends along the length direction of the coupler 151, that is, along the lateral edge of the door 100. Further, a slot 175 is periodically disposed at the second choke part 170.

An electromagnetic wave incident inside the cooking chamber 15 from the magnetron 24 (See, FIG. 4) is resonated inside the cooking chamber 15 in a specific mode, and such a mode determines an incidence angle of the electromagnetic wave to the door 100. Since shielding against an electromagnetic wave having various incidence angles is difficult using a choke having a simplified structure, the slot 175 is periodically formed at the second choke part 170 as described above.

The slot 175 is designed to effectively shield an electromagnetic wave being incident with an arbitrary incident angle.

One of important quantities determining performance of a filter implemented by the choke is incident angle dependence. Since an electromagnetic wave resonated inside the cooking chamber 15 is complicatedly distributed, the electromagnetic wave is incident into the door 100 with an angle in a range of 0 to 90 degrees. Therefore, a good filter should properly block the incident electromagnetic waves irrespective of various incidence angles thereof.

That is, the good filter should have no incident angle dependence, that is, high incident angle performance. Such incident angle performance tends to increase as a depth of the slot 175 becomes deeper, that is, as the slot 175 is deeply formed toward the inner side of the choke upper surface d from the outer end portion of the choke upper surface d.

In the present embodiment, the slot 175 is exemplified and formed to have a length corresponding to the length of the choke upper surface d. That is, the slot 175 of the present embodiment is formed to have a depth from the outer end side of the choke upper surface d to a boundary portion between the coupler 151 and the choke upper surface d.

When the slot 175 is formed up to the depth of the coupler 151, since it is difficult to secure a coupling surface for coupling the coupler 151 to the protruding frame 115 on the coupler 151, the length of the slot 175, which is formed with a depth from the outer end portion of the choke upper surface d to the boundary portion between the coupler 151 and the choke upper surface d, is a maximum length of the slot 175, which can be formed in the second choke part 170.

[Second Embodiment of Structure of Second Choke Part]

Meanwhile, the second choke part having the above-described structure is merely a preferred embodiment of the present disclosure, and there may be various embodiments that can replace them.

Figure 12:
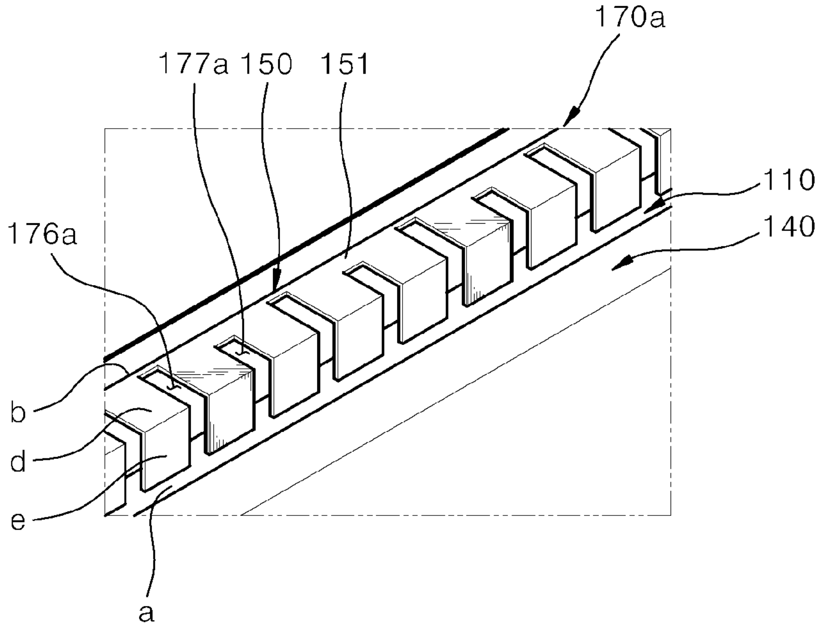
FIG. 12 is a perspective view illustrating a configuration of the second choke part according to a second embodiment of the present disclosure.
Figure 13:
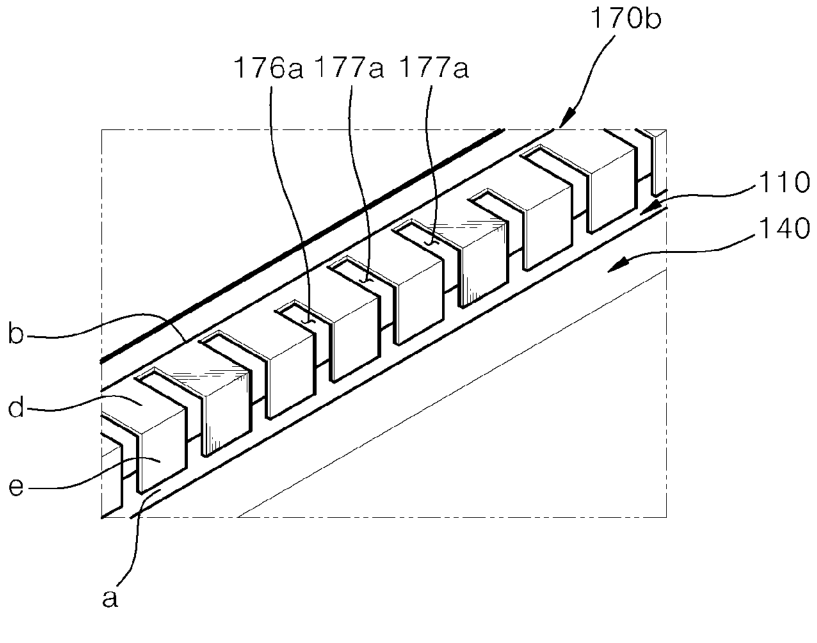
FIG. 13 is a perspective view illustrating a configuration of the second choke part according to a third embodiment of the present disclosure.

FIG. 12 is a perspective view illustrating a configuration of the second choke part according to a second embodiment of the present disclosure. FIG. 13 is a perspective view illustrating a configuration of the second choke part according to a third embodiment of the present disclosure.

Hereinafter, another embodiment of the present disclosure will be described with reference to FIGS. 12 and 13.

Here, the same reference numerals previously shown in the drawings denote the same members having the same functions, and thus a duplicated description will be omitted.

Referring to FIG. 12, a second choke part **170*a* according to the second embodiment of the present disclosure includes slots 176*a* and 177*a* different from the slot 175 (See, FIG. 10**) illustrated in the precedent embodiment.

In the present embodiment, the slots **176*a* and 177*a* may be configured to include a first slot 176*a* and a second slot 177*a***.

The first slot **176*a* is formed to have a length corresponding to the length of the choke upper surface d, that is, the depth from the outer end portion of the choke upper surface d to the boundary between the coupler 151** and the choke upper surface d.

Further, the second slot **177*a* is formed to have a length greater than the length of the choke upper surface d, that is, a depth longer than the first slot 176*a*. That is, the second slot 177*a* is formed in a recessed shape up to the depth of the coupler 151**.

According to the present embodiment, the slots **176*a* and 177*a* configured to include the first slot 176*a* and the second slot 177*a* are periodically disposed on the second choke part 170*a*, and the first slot 176*a* and the second slot 177*a*** are alternately disposed.

As is described above, the incident angle performance of the filter implemented by the second choke part **170*a* tends to increase as the depths of the slots 176***a* and 177*a* become deeper, but, when the slots 176*a* and 177*a* are formed up to the depth trespassing the coupler 151, it is difficult to secure a coupling surface on the coupler 151 for coupling the coupler 151 to the protruding frame 115.

In consideration of such circumstance, in the present embodiment, the first slot 176*a* and the second slot 177*a* are alternately disposed on the second choke part 170*a*.

That is, a coupling surface for the coupler 151 to the protruding frame 115 may be secured through a portion where the first slot 176*a* is formed, and a structure for improving the incident angle performance of the filter through the portion where the second slot 177*a* is formed may be secured.

This is a structure in consideration of which the coupling between the coupler 151 and the protruding frame 115 is not realized all over the coupler 151, but is intermittently realized in a portion of the coupler 151.

That is, a welding point for coupling the coupler 151 to the protruding frame 115 is secured through a portion where the first slot 176*a* is formed, and the second slot 177*a* is disposed at a point where welding is not required to improve the incident angle performance of the filter.

The second choke part 170*a* formed as the above-described form provides a coupling surface for forming the choke structure between the coupler 151 and the protruding frame 115, that is, the coupling surface between the choke frame 150 and the door panel 110 as well as more improved incident angle performance.

Referring to FIG. 13, the slots 176*a* and 177*a* including the first slot 176*a* and the second slot 177*a* are periodically disposed on the second choke part 170*b* according to the third embodiment of the present disclosure, and one or more first slots 176*a* and a greater number of second slots 177*a* than the number of first slots 176*a* are alternately disposed. In this embodiment, it is exemplified that one first slot 176*a* and two second slots 177*a* are alternately disposed on the second choke part 170*b*.

As another example, a structure in which one first slot 176*a* and three or more second slots 177*a* are alternately disposed on the second choke part 170*b*, or two first slots 176*a* and three or more second slots 177*a* are alternately disposed thereon is also applicable.

As still another example, it is also possible to apply a structure in which two or more first slots 176*a* and second slots 177*a* as the same number of the first slots 176*a* are alternately disposed on the second choke part 170*b*.

The second choke part 170*b* formed as described above increases the number of second slots 177*a* within a range in which a welding point for coupling the coupler 151 to the protruding frame 115 is secured through a portion where the first slot 176*a* is formed, so that there is an advantage that more improved incident angle performance may be provided when compared to the above-described embodiments.

While the present disclosure has been described with reference to the embodiments shown in the drawings, these embodiments are merely illustrative and it should be understood that various modifications and equivalent other embodiments can be derived by those skilled in the art on the basis of the embodiments. Accordingly, the technical scope of the present disclosure should be determined by the following claims.

What is claimed is:

1. A door comprising:

a door panel to form a frame of the door, at which an open window is formed inside the door panel, the door panel pivotable centering on a lower end portion of the door panel in one direction or in another direction, to open and close an open front surface of a main body of a cooking appliance;

a hinge member to pivotably couple the door panel to the main body;

a handle installed at an outer surface of the door panel;

a connection mechanism installed at an inner surface of the door panel and provided to connect the handle to the hinge member at a lateral outer side of the open window;

a plurality of first choke parts installed at the inner surface of the door panel, and disposed at a vertical outer side of the open window;

a plurality of second choke parts installed at the inner surface of the door panel and disposed at the lateral outer side of the open window, wherein the second choke parts are disposed between the open window and the connection mechanism; and a cover frame installed at the inner surface of the door panel, to accommodate the connection mechanism inside the cover frame and form side walls at the vertical outer side of the first choke parts and the lateral outer side of the second choke parts, wherein each of the first choke part and the second choke part includes:

a choke lower surface extending from the side wall formed by the cover frame in a width direction of the door panel;

a choke inner surface extending from the choke lower surface in a thickness direction of the door panel; and a choke upper surface extending from the choke inner surface in a direction toward the cover frame, and the second choke part further includes a choke extending surface extending from the choke upper surface.

2. The door of claim 1, wherein the choke extending surface extends in a direction towards the choke lower surface at a position spaced away from the choke inner surface by a length of the choke upper surface.

3. The door of claim 1, wherein the choke extending surface is formed such that the choke upper surface of the second choke part is formed to be bent in the direction toward the choke lower surface.

4. The door of claim 1, further comprising:

a choke frame installed at the inner surface of the door panel and at which at least a portion of the first choke part is formed at an upper edge and a lower edge of the choke frame, and at least a portion of the second choke part is formed at each of both lateral edges of the choke frame.

5. The door of claim 4, wherein the door panel further includes a protruding frame protruding in the thickness direction of the door panel and forming a side wall surrounding an outer side of the open window, the choke frame is coupled to the protruding frame, wherein the choke lower surface is formed by the door panel, the choke inner surface is formed by the side wall that is formed by the protruding frame, and the choke upper surface is formed at the edge of the choke frame.

6. The door of claim 5, wherein the choke frame is formed in a shape corresponding to a shape of the protruding frame and includes a coupler to couple to the protruding frame, and the choke upper surface is formed at an outer edge of the coupler.

7. The door of claim 6, further comprising:

a glass cover of a flat plate shape installed at the inner surface of the door panel to cover the open window, and the glass cover is installed to be in contact with the choke upper surface.

8. The door of claim 6, wherein a plurality of slots are periodically disposed along a length direction of the coupler to form the plurality of upper surfaces of the plurality of second choke parts.

9. The door of claim 8, further comprising:

the plurality of slots include a first slot formed to have a length corresponding to a length of the choke upper surface, and a second slot formed to have another length of the choke upper surface that is greater than the length of the choke upper surface formed by the first slot, and the first slot and the second slot are alternately disposed.

10. The door of claim 8, wherein the plurality of slots include a first slot formed to have a length corresponding to a length of the choke upper surface, and a second slot formed to have another length of the choke upper surface that is greater than the length of the choke upper surface formed by the first slot, and one or more of the first slots and a greater number of second slots than the one or more of the first slots are alternately disposed.

11. The door of claim 10, wherein the first slot is formed to have a length extending to a boundary portion between the choke upper surface and the coupler, and the second slot is formed to have a length further extending from the boundary portion between the choke upper surface and the coupler towards the coupler.

12. A cooking appliance comprising:

a main body at which a cooking chamber is formed inside the main body and having a front surface that is open; and a door installed at the front surface of the main body to open and close the cooking chamber, wherein the door includes:

a door panel to form a frame of the door, at which an open window is formed inside the door panel, the door panel pivotable centering on a lower end portion of the door panel in one direction or in another direction, to open and close the cooking chamber formed inside the main body;

a hinge member to pivotably couple the door panel to the main body;

a handle installed at an outer surface of the door panel;

a connection mechanism installed at an inner surface of the door panel and provided to connect the handle to the hinge member at a lateral outer side of the open window;

a plurality of first choke parts installed at the inner surface of the door panel, and disposed at a vertical outer side of the open window;

a plurality of second choke parts installed at the inner surface of the door panel and disposed at the lateral outer side of the open window, wherein the second choke parts are disposed between the open window and the connection mechanism; and a cover frame installed at the inner surface of the door panel, to accommodate the connection mechanism inside the cover frame and form side walls at the vertical outer side of the first choke parts and the lateral outer side of the second choke parts, wherein each of the first choke part and the second choke part includes:

a choke lower surface extending from the side wall formed by the cover frame in a width direction of the door panel;

a choke inner surface extending from the choke lower surface in a thickness direction of the door panel; and a choke upper surface extending from the choke inner surface in a direction toward the cover frame, and wherein the second choke part further includes a choke extending surface extending from the choke upper surface towards the door panel along a thickness direction of the door panel.

13. The door of claim 12, wherein the choke extending surface is formed such that the choke upper surface of the second choke part is formed to be bent in the direction toward the choke lower surface.

14. The door of claim 12, further comprising:

a choke frame installed at the inner surface of the door panel and at which at least a portion of the first choke part is formed at an upper edge and a lower edge of the choke frame, and at least a portion of the second choke part is formed at each of both lateral edges of the choke frame.

15. The door of claim 14, wherein the door panel further includes a protruding frame protruding in the thickness direction of the door panel and forming a side wall surrounding an outer side of the open window, the choke frame is coupled to the protruding frame, wherein the choke lower surface is formed by the door panel, the choke inner surface is formed by the side wall that is formed by the protruding frame, and the choke upper surface is formed at the edge of the choke frame.

16. The door of claim 15, wherein the choke frame is formed in a shape corresponding to a shape of the protruding frame and includes a coupler to couple to the protruding frame, and the choke upper surface is formed at an outer edge of the coupler.

17. The door of claim 16, further comprising:

a glass cover of a flat plate shape installed at the inner surface of the door panel to cover the open window, and the glass cover is installed to be in contact with the choke upper surface.

18. The door of claim 16, further comprising:

a plurality of slots periodically disposed along a length direction of the coupler to form the plurality of upper surfaces of a plurality of second choke parts, the plurality of slots include a first slot formed to have a length corresponding to a length of the choke upper surface, and a second slot formed to have another length of the choke upper surface that is greater than the length of the choke upper surface formed by the first slot, and the first slot and the second slot are alternately disposed.

19. The door of claim 16, further comprising:

a plurality of slots periodically disposed along a length direction of the coupler to form the plurality of upper surfaces of a plurality of second choke parts, the plurality of slots include a first slot formed to have a length corresponding to a length of the choke upper surface, and a second slot formed to have another length of the choke upper surface that is greater than the length of the choke upper surface formed by the first slot, and one or more of the first slots and a greater number of second slots than the one or more of the first slots are alternately disposed.

20. The door of claim 19, wherein the first slot is formed to have a length extending to a boundary portion between the choke upper surface and the coupler, and the second slot is formed to have a length further extending from the boundary portion between the choke upper surface and the coupler towards the coupler.

* * * * *